(12) United States Patent
Nemoto

(10) Patent No.: US 7,006,534 B1
(45) Date of Patent: Feb. 28, 2006

(54) RADIO COMMUNICATION SYSTEM AND METHOD FOR CALCULATING TRANSMISSION TIMING BETWEEN A TERMINAL UNIT AND A BASE STATION BASED UPON LOCATION, DISTANCE, OR PROPAGATION TIME

(75) Inventor: Kenji Nemoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/426,654

(22) Filed: Oct. 25, 1999

(30) Foreign Application Priority Data

Mar. 18, 1999 (JP) ................................. 11-073178

(51) Int. Cl.
*H04J 3/06* (2006.01)

(52) U.S. Cl. .................... 370/508; 370/468; 455/67.11

(58) Field of Classification Search ................ 370/347, 370/337, 437, 442, 458, 468, 498, 503, 508, 370/507, 329, 330, 336, 345, 348, 465, 478, 370/436, 443; 455/450, 452, 67.1, 67.11
See application file for complete search history.

(56) References Cited

U.S. PATENT DOCUMENTS

| 5,745,484 A | * | 4/1998 | Scott .......................... 370/508 |
| 5,802,046 A | * | 9/1998 | Scott .......................... 370/508 |
| 6,016,322 A | * | 1/2000 | Goldman .................... 370/508 |
| 6,049,538 A | * | 4/2000 | Scott .......................... 370/508 |
| 6,233,257 B1 | * | 5/2001 | Yoshida et al. ............. 370/508 |
| 6,477,151 B1 | * | 11/2002 | Oksala ........................ 370/508 |

* cited by examiner

*Primary Examiner*—Rafael Perez-Gutierrez
(74) *Attorney, Agent, or Firm*—Katten Muchin Rosenman LLP

(57) ABSTRACT

Radio communication system and method capable of expanding the coverage of a radio base station and thereby permitting efficient radio communications. A continuous time slot allocating unit continuously allocates time slots in a frame to generate a continuous time slot. During the period of the continuous time slot, a propagation information calculating unit communicates with a terminal unit to calculate propagation information about radio wave propagation between the radio base station and the terminal unit. Also, during the period of the continuous time slot, a transmission timing calculating unit calculates, based on the propagation information, transmission timing for a signal to be transmitted from the terminal unit to the radio base station. Signal transmitting unit transmits the signal in accordance with the transmission timing.

7 Claims, 16 Drawing Sheets

US 7,006,534 B1

RADIO COMMUNICATION SYSTEM AND METHOD FOR CALCULATING TRANSMISSION TIMING BETWEEN A TERMINAL UNIT AND A BASE STATION BASED UPON LOCATION, DISTANCE, OR PROPAGATION TIME

BACKGROUND OF THE INVENTION (1) Field of the Invention

The present invention relates to radio communication system and method, and more particularly, to radio communication system and method for performing radio communication control of a system adopting TDMA-TDD.

(2) Description of the Related Art

In radio communications, a large number of users share a common frequency band to communicate with their respective parties, and accordingly, in order to prevent interference of communications between unintended parties, TDMA (Time Division Multiple Access) is widely used on a practical basis in which time is divided for individual users so that an identical frequency may be shared by multiple users.

In PHS (Personal Handyphone System) or SU (Subscriber Unit) which is a fixed subscriber terminal unit installed at home for the purpose of communications, TDD (Time Division Duplexing) transmission is carried out in which transmission and reception are performed alternately in time, using an identical carrier wave. Such TDMA-TDD systems permit efficient use of an allotted frequency band.

FIG. 15 illustrates an arrangement of slots in a TDMA-TDD frame. With respect to the frequency from one radio base station, four channels of transmitting slots TX1 to TX4 and receiving slots RX1 to RX4 are multiplexed in one frame (384 Kbps) of 5 ms long.

To prevent collision of radio signals from being caused due to propagation delay difference, clock jitter or the like, a frame is provided with guard bits g of 16 bits long. Each of TX and RX consists of 240 bits, inclusive of the guard bits g.

SU1, which is located at a short distance from the radio base station, receives down data from the radio base station in a slot time of the transmitting slot TX1, and upon lapse of a fixed time (2.5 msec) from the reception, outputs up data. The radio base station can receive the up data from the SU1 located at a short distance therefrom in the receiving slot RX1.

On the other hand, SU2, which is located relatively distantly from the radio base station, receives down data from the radio base station in a slot time of the transmitting slot TX2 after a delay of a propagation delay time td0.

Accordingly, for the radio base station, the output of up data from the SU2 is delayed for a time (2.5 msec+td0), but since the delay is within the range of protection of the guard bits g as shown in the figure, the radio base station can receive the up data from the SU2 in the receiving slot RX2.

The conventional TDMA-TDD technique described above is, however, associated with a problem that the coverage (service area) cannot be expanded even if the output power of the radio base station or SU is increased.

FIG. 16 illustrates the problem with the conventional TDMA-TDD. SU3, which is located at a long distance from the radio base station, receives down data from the radio base station in a slot time of the transmitting slot TX3 after a delay of a propagation delay time td1.

Accordingly, for the radio base station, the output of up data from the SU3 is delayed for a time (2.5 msec+td1); in this case, the delay is outside the range of protection of the guard bits g, as shown in the figure, and the up data spans the receiving slots RX3 and RX4. Consequently, the radio base station is incapable of reception in the receiving slots RX3 and RX4, with the result that the number of usable time slots decreases.

Thus, the SU3 located at a long distance from the radio base station is unable to communicate with the radio base station, so that data transmission/reception needs to be performed with respect to some other radio base station located at a shorter distance from the SU3.

Accordingly, where a plurality of Sus are installed, the number of radio base stations installed must be increased correspondingly to cover these SUs, but it is desirable from an economical viewpoint that more SUs be covered by the least possible number of radio base stations.

SUMMARY OF THE INVENTION

One object of the present invention is to provide a radio communication system which permits expansion of the coverage of a radio base station and ensures efficient communications.

To achieve the above object, there is provided a radio communication system for performing radio communication control. The radio communication system comprises a propagation information calculation device including continuous time slot allocating means for continuously allocating time slots in a frame to generate a continuous time slot, and propagation information calculating means for communicating with a terminal unit during a period of the continuous time slot to calculate propagation information about radio wave propagation between a radio base station and the terminal unit, and a transmission timing calculation device including transmission timing calculating means for calculating, during the period of the continuous time slot and based on the propagation information, transmission timing for a signal to be transmitted from the terminal unit to the radio base station, and signal transmitting means for transmitting the signal in accordance with the transmission timing.

Another object of the present invention is to provide a radio communication method which permits expansion of the coverage of a radio base station and ensures efficient communications. The radio communication method comprises continuously allocating time slots in a frame to generate a continuous time slot, communicating with a terminal unit during a period of the continuous time slot to calculate propagation information about radio wave propagation between a radio base station and the terminal unit, calculating, during the period of the continuous time slot and based on the propagation information, transmission timing for a signal to be transmitted from the terminal unit to the radio base station, and transmitting the signal in accordance with the transmission timing.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
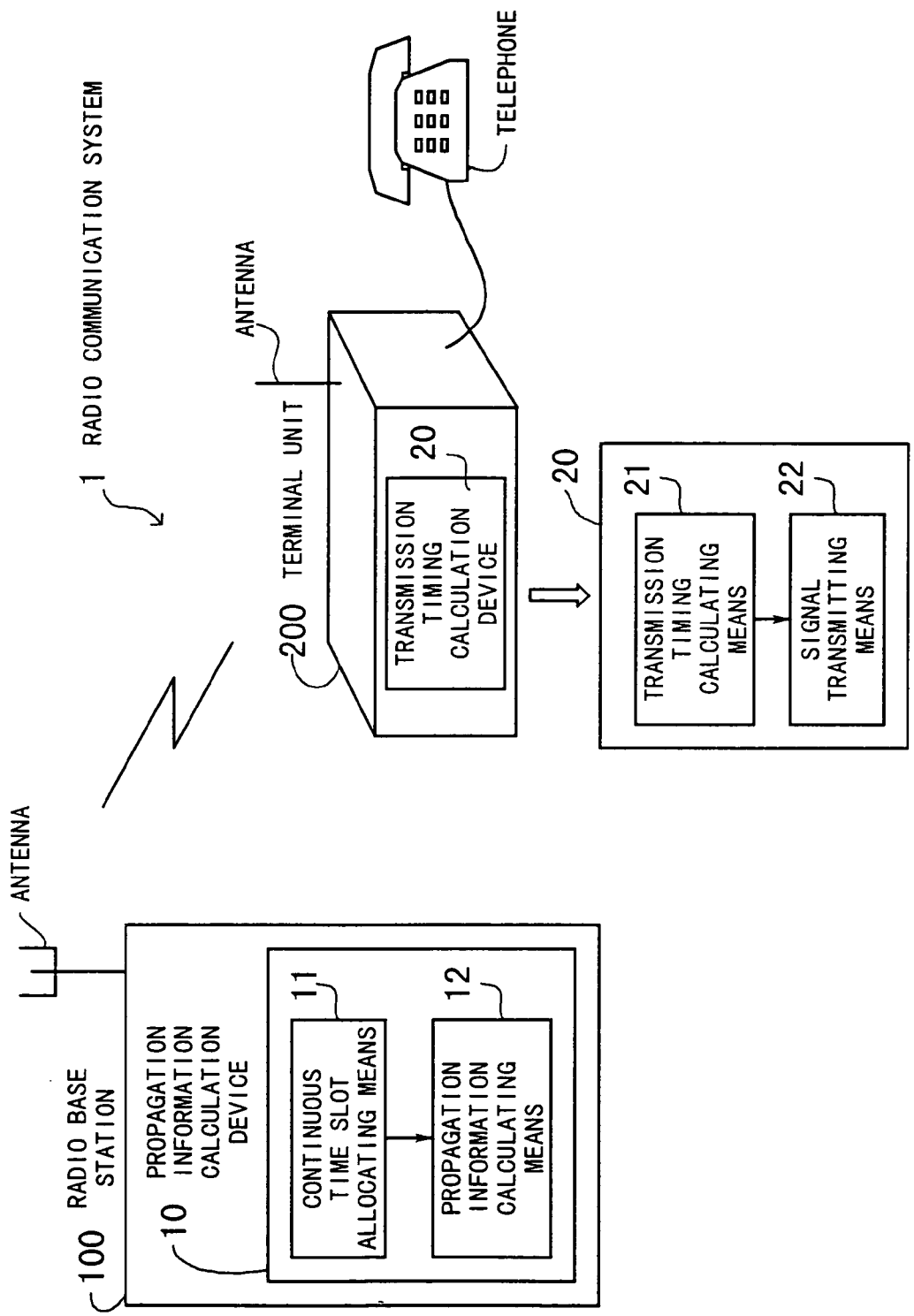
FIG. 1 is a diagram illustrating the principle of a radio communication system according to the present invention.

Embodiments of the present invention will be hereinafter described with reference to the drawings. FIG. 1 illustrates the principle of a radio communication system according to the present invention. A radio communication system 1 comprises a propagation information calculation device 10 and a transmission timing calculation device 20.

The propagation information calculation device 10 is arranged in a radio base station 100, and the transmission timing calculation device 20 is arranged in a terminal unit 200 connected to a telephone. Radio communication is established between the terminal unit 200 and the radio base station 100 via their antennas.

The description below is based on the assumption that the terminal unit 200 is a subscriber terminal unit which performs communication at a fixed location.

In the propagation information calculation device 10, continuous time slot allocating means 11 continuously allocates time slots in a TDMA-TDD frame to generate a continuous time slot.

Figure 2:
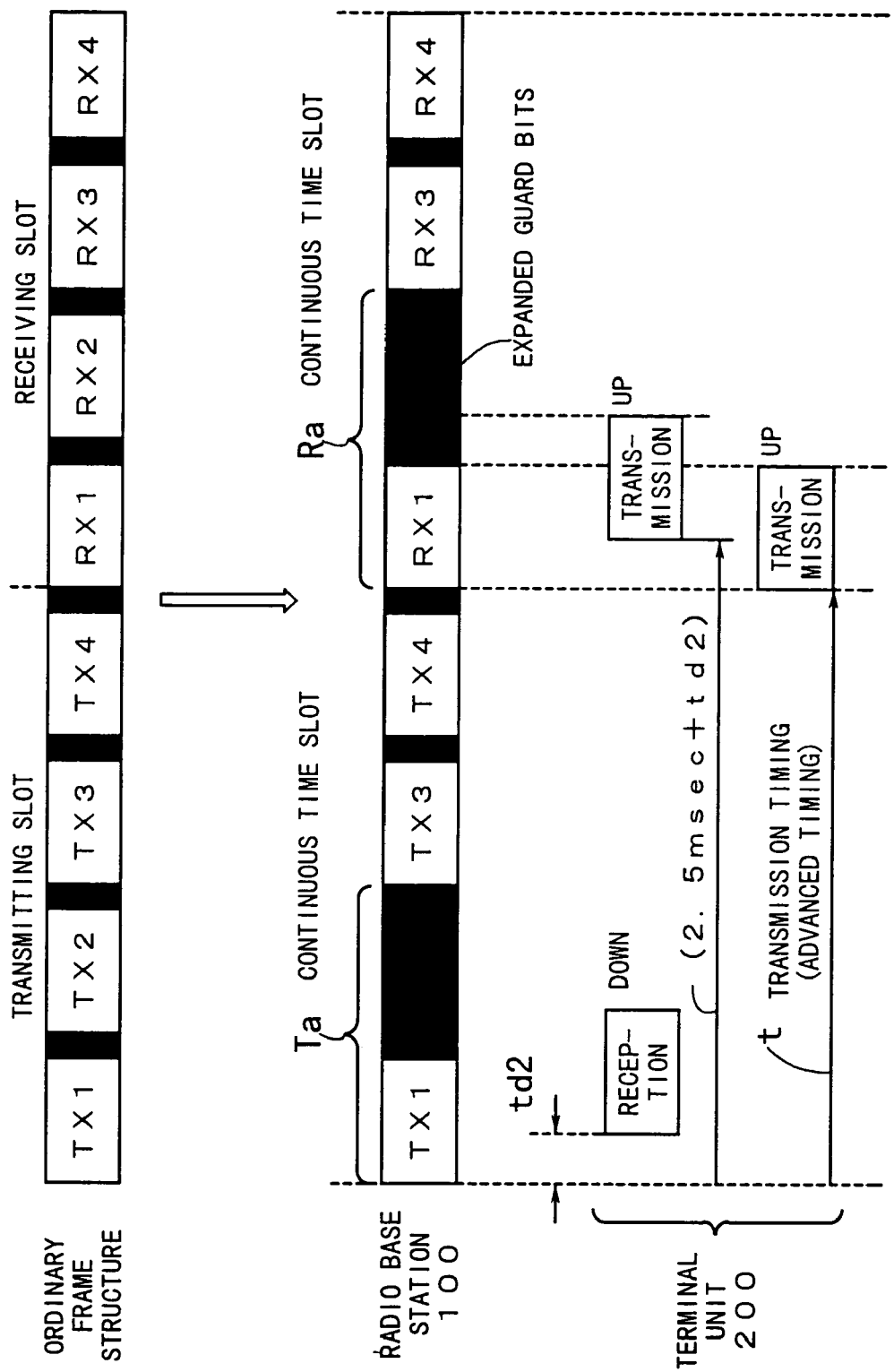
FIG. 2 is a diagram illustrating continuous time slot and transmission timing.

Specifically, a continuous time slot is a combination of one control time slot and expanded guard bits and corresponds to two time slots, as described later with reference to FIG. 2.

During the period of the continuous time slot, propagation information calculating means 12 communicates with the terminal unit 200 and calculates propagation information about radio wave propagation between the radio base station 100 and the terminal unit 200.

Specifically, first, test data is transmitted to the terminal unit 200. Then, the time required until the reception of the test data sent back from the terminal unit 200 is measured to calculate, as the propagation information, a radio wave propagation time or distance (=radio wave propagation time*light speed) between the radio base station 100 and the terminal unit 200.

During the period of the continuous time slot, transmission timing calculating means 21 of the terminal unit 200 calculates, based on the propagation information, transmission timing for a signal to be transmitted from the terminal unit 200 to the radio base station 100.

Namely, "advanced" timing is calculated such that it is timed with the timing of a corresponding receiving slot of the radio base station 100. In accordance with the calculated transmission timing, signal transmitting means 22 transmits a signal to the radio base station 100.

The transmission timing calculation device 20 also stores the calculated transmission timing information in a nonvolatile memory (not shown) such as a flash memory. This eliminates the need to again perform the transmission timing calculation process when communication with the radio base station 100 is started.

The continuous time slot and the transmission timing will be now described. FIG. 2 illustrates the continuous time slot and the transmission timing. In ordinary frames, four channels of transmitting slots TX1 to TX4 and receiving slots RX1 to RX4 are multiplexed to constitute one frame.

First, a time notification request, described later, is transmitted from the terminal unit 200 to the radio base station 100, whereupon the continuous time slot allocating means 11 allocates continuous time slots as shown in the figure.

Specifically, a down continuous time slot Ta consisting of a transmitting slot TX1 and a time slot, which comprises guard bits extending up to a transmitting slot TX2, and an up continuous time slot Ra consisting of a receiving slot RX1 and a time slot, which comprises guard bits extending up to a receiving slot RX2, are generated.

The terminal unit 200, which is located at a long distance from the radio base station 100, receives down data from the radio base station 100 at the illustrated time after a delay of a propagation delay time td2.

Accordingly, for the radio base station 100, the output of up data from the terminal unit 200 is delayed for a time (2.5 msec+td2) (2.5 msec is a predetermined time period from the detection of down data to the transmission of up data). However, since the continuous time slot Ra has an expanded range of protection provided by the guard bits as illustrated, the radio base station 100 can receive the up data from the terminal unit 200 in the continuous time slot Ra (the up data is received virtually in RX1 with expanded guard bits).

During the period of the thus-allocated continuous time slot, therefore, the propagation information calculating means 12 creates propagation information by exchanging down data and up data between the radio base station 100 and the terminal unit 200 (between the radio base station 100 and the terminal unit 200 separated at such a distance from each other that normal communication can be established therebetween during the period of the allocated continuous time slot, without data riding into other time slots).

Also, during the period of the allocated continuous time slot, the transmission timing calculating means 21 calculates, based on the calculated propagation information, transmission timing (advanced timing) t such that up data can be timely received in the receiving slot RX1.

Once the transmission timing t is determined, allocation of the continuous time slot is canceled. Although the terminal unit 200 thereafter receives down data in the transmitting slot TX1 after a delay of the propagation delay time td2, it transmits up data earlier at the advanced transmission timing t, so that the up data can be timely received in the receiving slot RX1.

Thus, in the radio communication system 1 according to the present invention, a continuous time slot is generated, propagation information is calculated during the period of the continuous time slot, and transmission timing t is calculated based on the propagation information to transmit a signal.

According to the present invention, therefore, the coverage can be expanded so as to cover the terminal unit 200 which is located at a long distance from the radio base station 100 and thus is otherwise outside the coverage of the radio base station 100, so that the terminal unit 200 can be serviced by the radio base station 100.

Also, since the coverage is expanded, the total number of radio base stations may be small and time slots can be made good use of, thus permitting economical and efficient radio communications.

Figure 3:
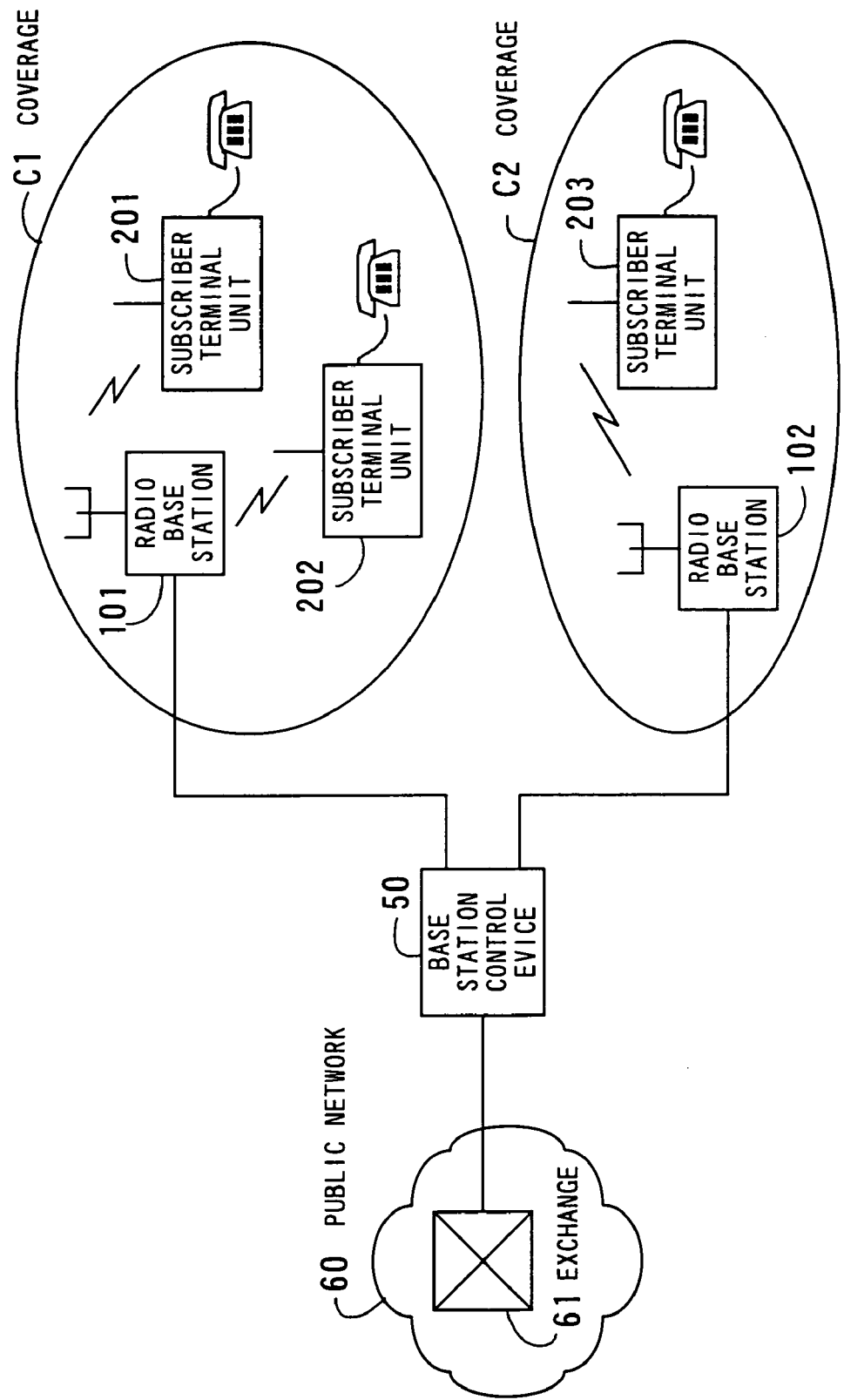
FIG. 3 is a diagram illustrating an outline of WLL configuration.

WLL (Wireless Local Loop) to which the radio communication system 1 of the present invention is applied will be now described. FIG. 3 illustrates an outline of WLL configuration. WLL is a system that allows wireless connection between a subscriber-side exchange and a subscriber's home, which were conventionally connected by a wireline.

A WLL system comprises a public network 60 including an exchange 61, a base station control device 50, and a plurality of coverage areas C1 and C2.

The coverage C1 includes a radio base station 101 and subscriber terminal units 201 and 202, and the coverage C2 includes a radio base station 102 and a subscriber terminal unit 203. Telephones are connected to the respective subscriber terminal units 201 to 203.

The base station control device 50 connects the exchange 61 to each of the radio base stations 101 and 102 by a wireline link, and controls the radio base stations 101 and 102. The subscriber terminal units 201 and 202 are each connected to the radio base station 101 by a wireless link, and perform subscriber radio control for the wireless connection between the telephone connected thereto and the radio base station 101.

Similarly, the subscriber terminal unit 203 is connected to the radio base station 102 by a wireless link, and performs subscriber radio control for the wireless connection between the telephone connected thereto and the radio base station 102.

In the WLL system described above, if the coverage C1 of the radio base station 101 can be expanded so as to cover not only the subscriber terminal units 201 and 202 but also the subscriber terminal unit 203 located at a long distance from the radio base station 101, then the number of radio base stations can be reduced, which is preferable from an economical viewpoint. The present invention makes it possible to expand the coverage of a radio base station, thereby permitting efficient radio communications.

As such WLL system, PHS-WLL system in particular, which uses a data transmission method complying with PHS, has been recently developed, and it is generally the case that the subscriber terminal unit has a network-initiated type construction like PHS terminal.

Figure 4:
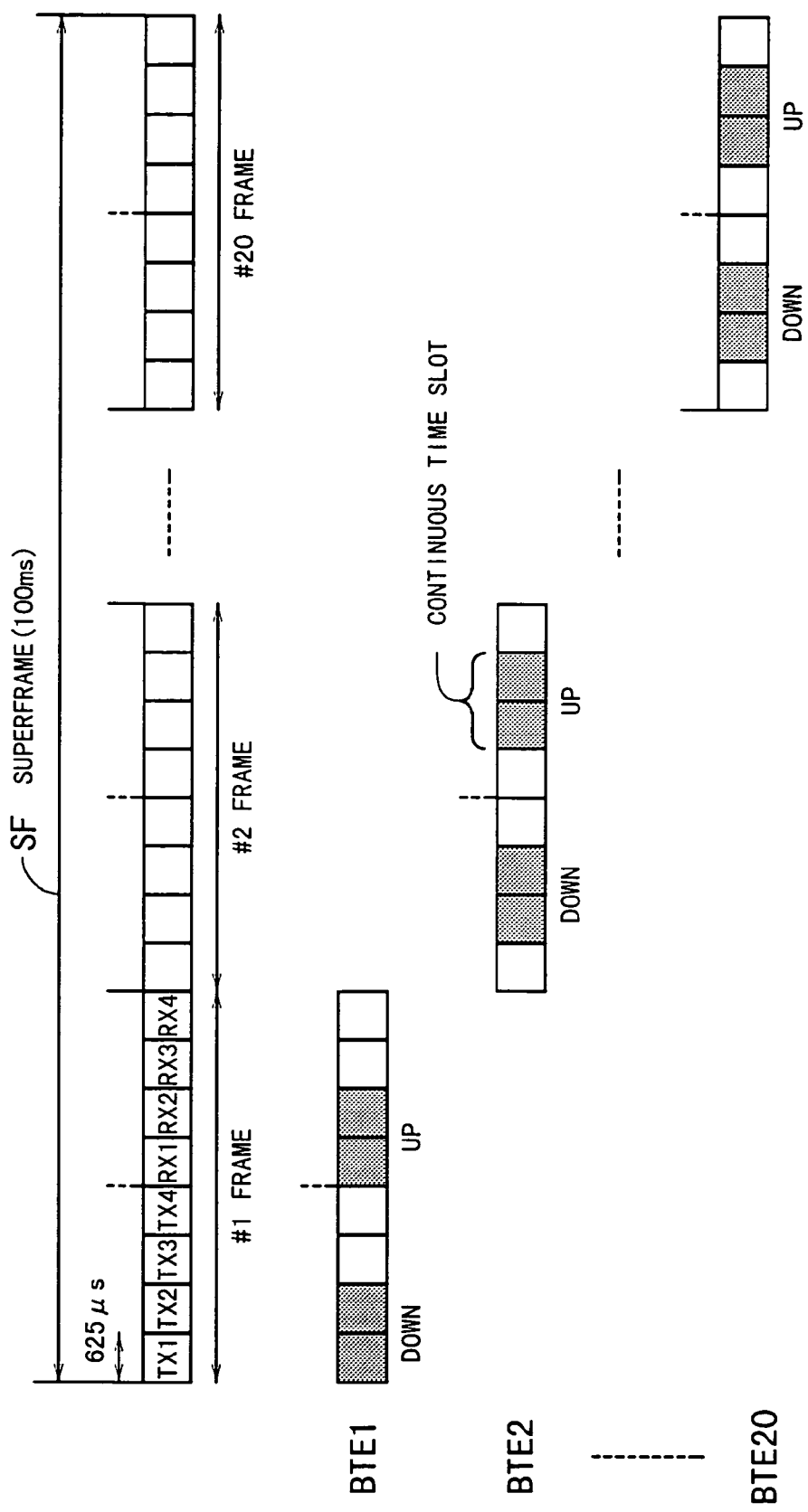
FIG. 4 is a diagram illustrating allocation of continuous time slots.

The continuous time slot allocating means 11 will be now described. FIG. 4 shows how continuous time slots are allocated.

In TDMA-TDD, four channels of transmitting slots TX1 to TX4 and receiving slots RX1 to RX4, each being a time slot of 625 µs long, are multiplexed to constitute one frame of 5 ms long. Twenty such frames are combined to constitute a superframe SF (100 ms).

In the first frame of the superframe SF, down time slots TX1 and TX2 and up time slots RX1 and RX2 are allocated to BTE (Base Transceiver Equipment: radio base station) 1 as continuous time slots.

BTE 2 is allocated, as continuous time slots, down time slots TX2 and TX3 and up time slots RX2 and RX3 of the second frame.

By allocating continuous time slots in this manner, up to BTE 20 can be allocated continuous time slots in the superframe SF.

Namely, the BTE 20 is allocated down time slots TX2 and TX3 and up time slots RX2 and RX3 of the twentieth frame as continuous time slots.

Figure 5:
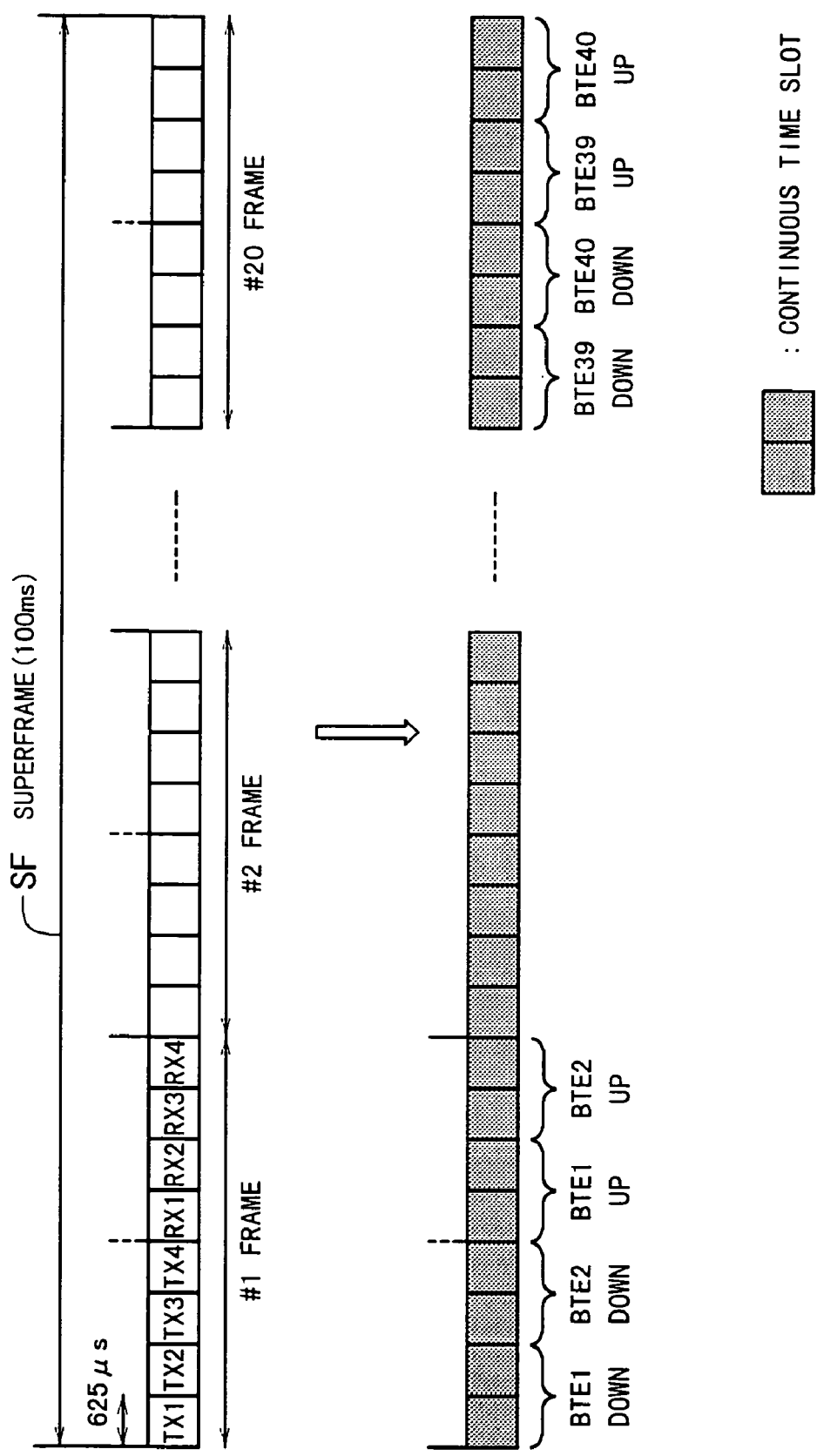
FIG. 5 is a diagram illustrating a superframe in one frame of which are allocated continuous time slots for two radio base stations.

Alternatively, in one frame, continuous time slots of two radio base stations may be allocated. FIG. 5 shows a superframe SF in which continuous time slots of two radio base stations are allocated to one frame.

The BTE 1 is allocated down time slots TX1 and TX2 and up time slots RX1 and RX2 of the first frame as continuous time slots. The BTE 2 is allocated down time slots TX3 and TX4 and up time slots RX3 and RX4 of the first frame as continuous time slots.

By allocating continuous time slots in this manner, up to BTE 40 can be allocated continuous time slots in the superframe SF.

Namely, down time slots TX1 and TX2 and up time slots RX1 and RX2 of the twentieth frame are allocated to BTE 39 as continuous time slots, and down time slots TX3 and TX4 and up time slots RX3 and RX4 of the twentieth frame are allocated to the BTE 40 as continuous time slots.

If all of the time slots of one superframe SF are allocated in this manner, then a maximum of 40 radio base stations can be allocated continuous time slots.

In either of the cases shown in FIGS. 4 and 5, however, the continuous time slot is never allocated in such a manner as to span the boundary between the transmitting and receiving slots TX and RX.

After the transmission timing t is calculated following the allocation of continuous time slots, the allocation of continuous time slots is canceled. Thereafter, ordinary TDMA-TDD is resumed in which communication is performed while using one slot of each set of the transmitting slots TX and the receiving slots RX as a control time slot and the remaining time slots as bearer time slots.

Figure 6:
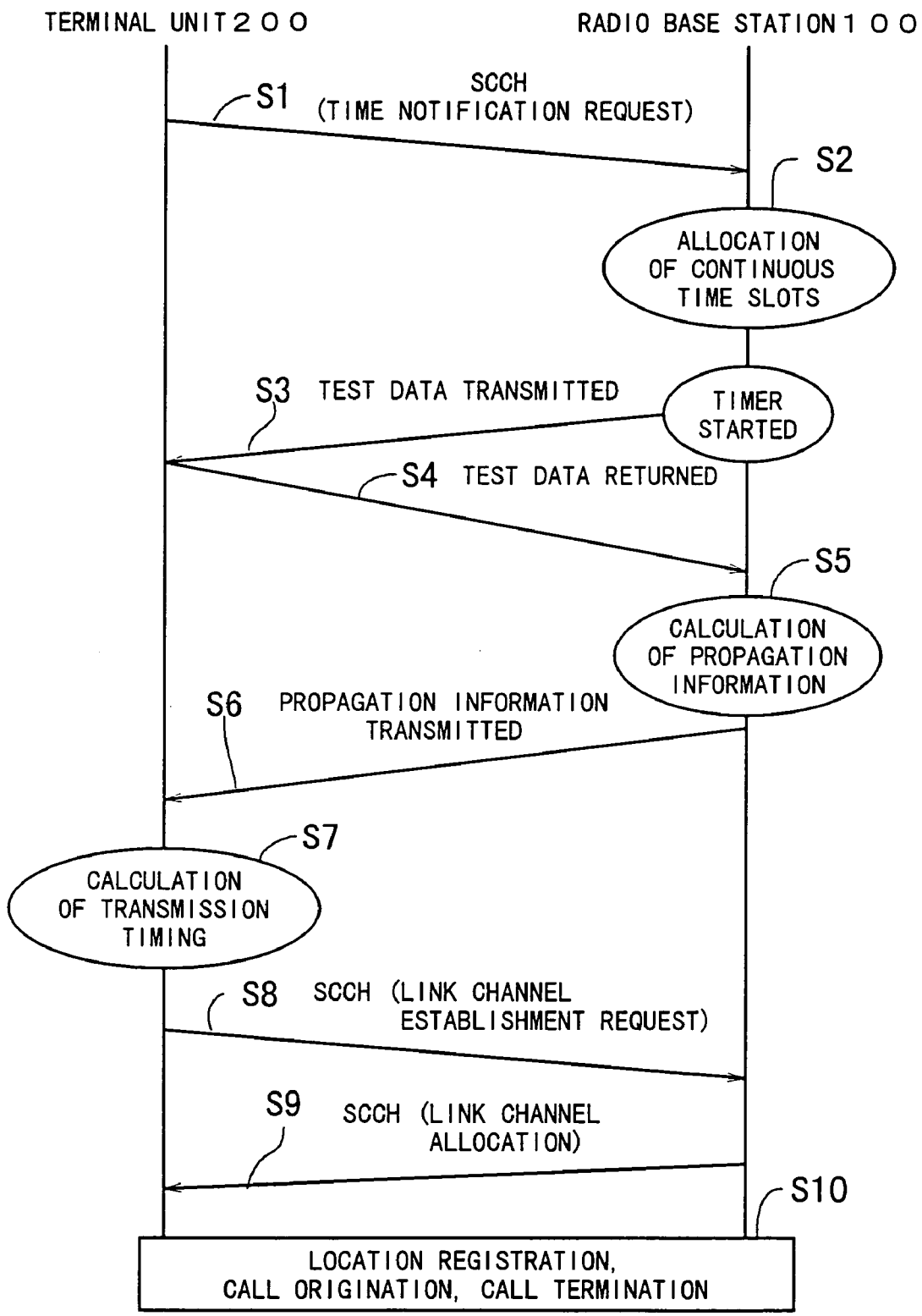
FIG. 6 is a chart showing a transmission timing calculation sequence.

The following describes a sequence in which communication is performed between the radio base station 100 and the terminal unit 200 to calculate the transmission timing t. FIG. 6 shows the transmission timing t calculation sequence.

[S1] Using SCCH (Signaling Control Channel: cell associated channel) which is a control channel, the terminal unit 200 transmits a time notification request to the radio base station 100. The SCCH is a control channel which is used when information necessary for call connection is transferred between the radio base station 100 and the terminal unit 200.

[S2] The continuous time slot allocating means 11 of the radio base station 100 allocates up and down time slots to continuous time slots.

[S3] The continuous time slot allocating means 11 transmits test data to the terminal unit 200. Also, an internal timer is started and the time at which the test data was transmitted is stored.

[S4] The terminal unit 200 receives the test data and sends it back to the radio base station 100.

If the test data is not returned from the terminal unit 200 and the timer in the continuous time slot allocating means 11 signals time-out, Steps S3 and S4 are repeated.

[S5] The propagation information calculating means 12 of the radio base station 100 receives the test data sent back from the terminal unit 200 and detects the time at which the data was received. Then, based on the time stored in step S3 and the reception time, a radio wave propagation time or distance between the radio base station 100 and the terminal unit 200 is calculated. It is here assumed that the propagation time is calculated.

[S6] The propagation time is transmitted to the terminal unit 200 as the propagation information.

[S7] Based on the propagation time, the transmission timing calculating means 21 calculates transmission timing t in accordance with which a signal is to be transmitted from the terminal unit 200 to the radio base station 100.

Namely, advanced timing is calculated such that it is timed with the timing of a corresponding receiving slot of the radio base station 100.

[S8] In accordance with the transmission timing t thus obtained, the terminal unit 200 transmits a link channel establishment request to the radio base station 100 by using the SCCH.

[S9] If the link channel establishment request is received normally, the radio base station 100 sends a link channel allocation back to the terminal unit 200 by using the SCCH.

[S10] Location registration, call origination and call termination are thereafter performed between the radio base station 100 and the terminal unit 200. When the terminal unit 200 transmits up data to the radio base station 100, however, all such data is transmitted by the signal transmitting means 22 in accordance with the transmission timing t calculated in step S7.

Figure 7:
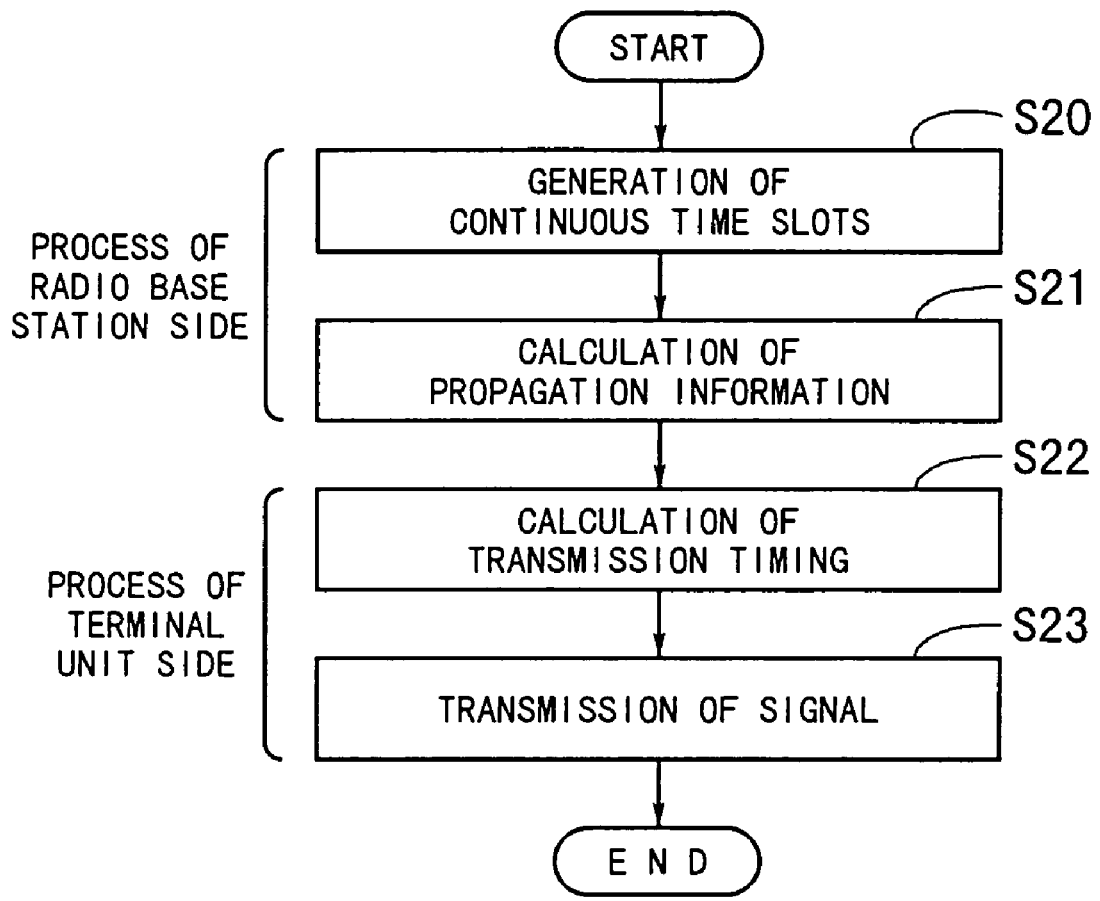
FIG. 7 is a flowchart showing a procedure of a radio communication method according to the present invention.

A radio communication method according to the present invention will be now described. FIG. 7 is a flowchart showing a procedure of the radio communication method according to the present invention.

[S20] The time slots in a frame are continuously allocated to generate continuous time slots.

[S21] During the period of the continuous time slot, communication with the terminal unit is performed to calculate propagation information about the radio wave propagation between the radio base station and the terminal unit.

To calculate the propagation information, a time period from the transmission of test data to the terminal unit to the reception of the test data returned from the terminal unit is measured, and a radio wave propagation time or distance between the radio base station and the terminal unit is calculated.

[S22] During the period of the continuous time slot, transmission timing in accordance with which a signal is to be transmitted from the terminal unit to the radio base station is calculated based on the propagation information.

[S23] Signal is transmitted in accordance with the transmission timing.

As described above, in the radio communication system 1 and method according to the present invention, continuous time slots are generated, and during the period of the continuous time slot, communication with the terminal unit 200 is performed to calculate propagation information about the radio wave propagation between the radio base station 100 and the terminal unit 200 and transmission timing t is calculated based on the propagation information for transmitting signal.

This makes it possible to expand the coverage of the radio base station 100, thus permitting efficient radio communications.

Also, since the transmission timing t is automatically determined during communication between the radio base station 100 and the terminal unit 200, neither the radio base station 100 nor the terminal unit 200 requires special engineering work or the like, whereby operation efficiency and maintainability are improved.

Figure 8:
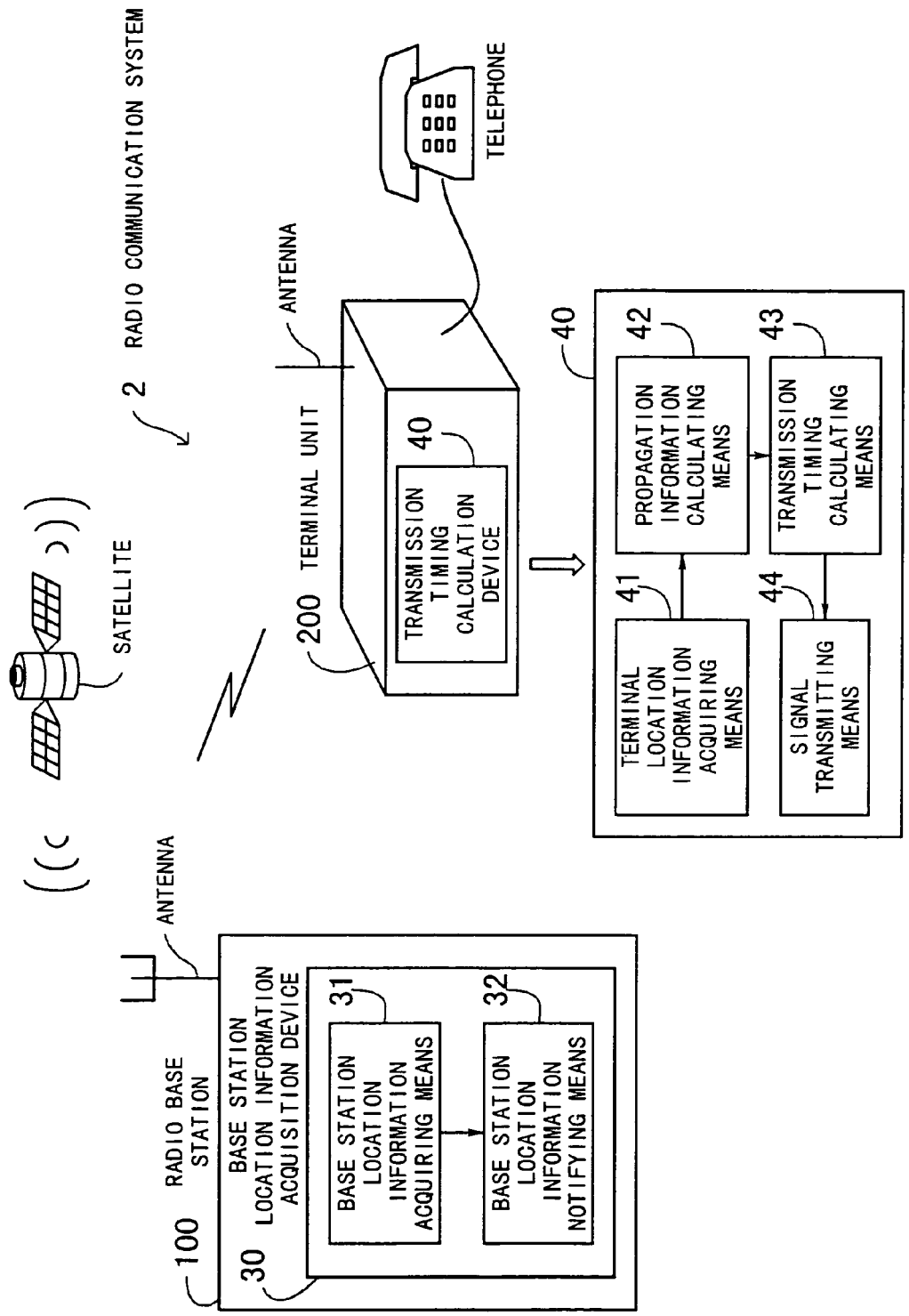
FIG. 8 is a diagram illustrating the principle of a radio communication system according to a modification of the invention.

A modification of the radio communication system 1 of the present invention will be now described. FIG. 8 illustrates the principle of the modification of the radio communication system 1.

A radio communication system 2, which is a modification of the present invention, comprises a base station location information acquisition device 30 and a transmission timing calculation device 40.

The base station location information acquisition device 30 is arranged in the radio base station 100, and the transmission timing calculation device 40 is arranged in the terminal unit 200 connected to a telephone. The terminal unit 200 and the radio base station 100 perform radio communication with each other via their antennas. The terminal unit 200 corresponds to the subscriber terminal unit.

In the base station location information acquisition device 30, base station location information acquiring means 31 acquires base station location information which is information about the location of the radio base station 100.

For example, using GPS (Global Positioning System) which is a satellite-assisted positioning system, base station location information is acquired. Base station location information notifying means 32 notifies the terminal unit 200 of the base station location information.

Terminal location information acquiring means 41 of the transmission timing calculation device 40 acquires terminal location information which is information about the location of the terminal unit 200.

Using GPS which is a satellite-assisted positioning system, for example, terminal location information is acquired.

Based on the base station location information and the terminal location information, propagation information calculating means 42 calculates propagation information about radio wave propagation between the radio base station 100 and the terminal unit 200. Specifically, a radio wave propagation time or distance (=radio wave propagation time*light speed) between the radio base station 100 and the terminal unit 200 is calculated as the propagation information.

Based on the propagation information, transmission timing calculating means 43 calculates transmission timing for a signal to be transmitted from the terminal unit 200 to the radio base station 100. The transmission timing is identical with the aforementioned advanced timing. In accordance with the transmission timing, signal transmitting means 44 transmits a signal to the radio base station 100.

Also, the transmission timing calculation device 40 stores information on the calculated transmission timing in a nonvolatile memory (not shown) such as a flash memory.

Figure 9:
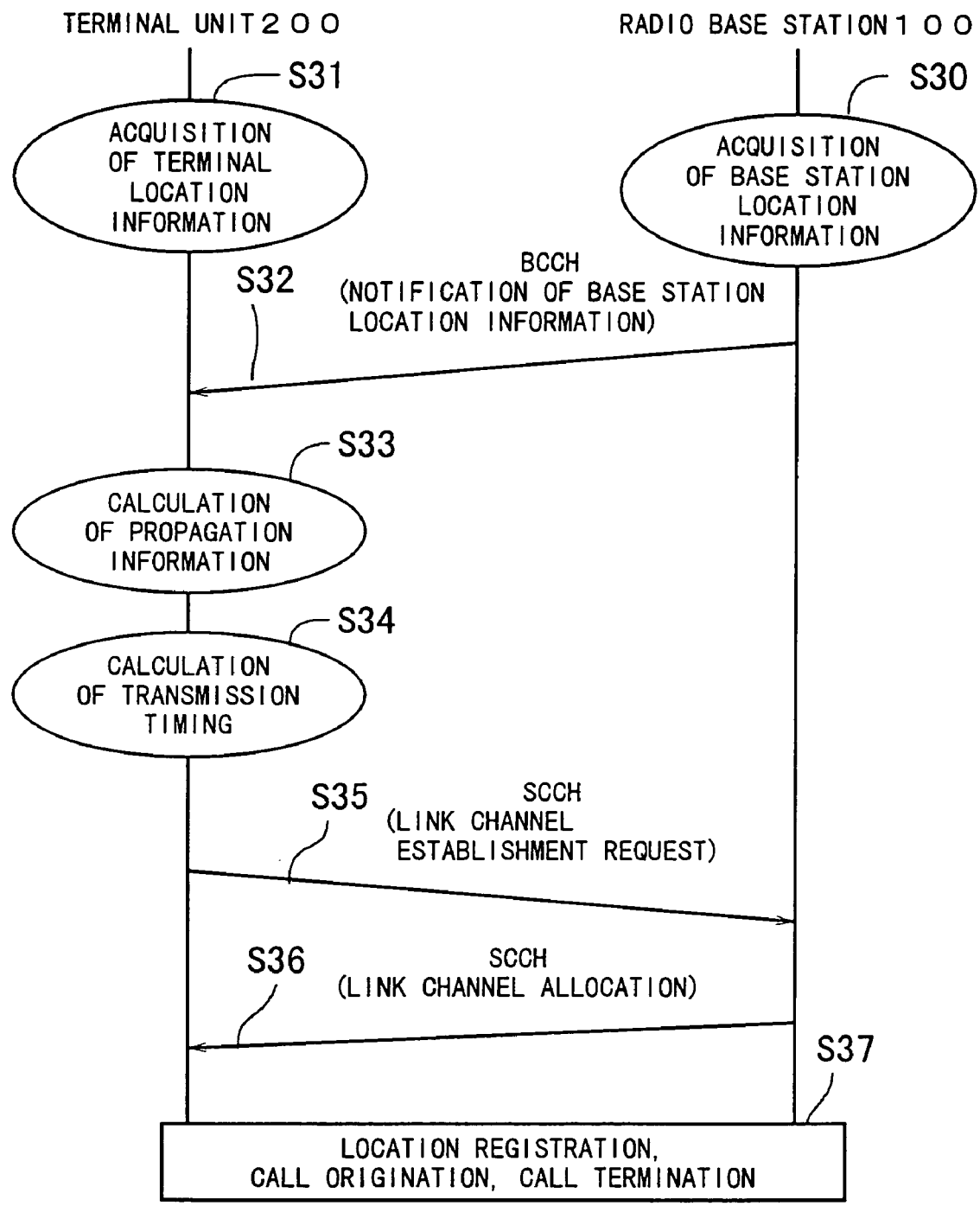
FIG. 9 is a chart showing a transmission timing calculation sequence.

The following describes a sequence in which communication between the radio base station 100 and the terminal unit 200 is performed to calculate transmission timing. FIG. 9 illustrates the transmission timing calculation sequence.

[S30] The base station location information acquiring means 31 of the radio base station 100 acquires base station location information which is information about its own location, by means of GPS.

[S31] The terminal location information acquiring means 41 of the terminal unit 200 acquires terminal location information which is information about its own location, by means of GPS.

[S32] Using BCCH (Broadcast Control Channel) which is a control channel, the base station location information notifying means 32 of the radio base station 100 transmits the base station location information to the terminal unit 200 (in practice, the information is broadcast to a plurality of terminal units).

The BCCH is a control channel via which a control signal is transmitted from the radio base station 100 to the terminal unit 200.

[S33] Based on the base station location information and the terminal location information, the propagation information calculating means 42 of the terminal unit 200 calculates propagation information.

[S34] Based on the propagation information, the transmission timing calculating means 43 calculates transmission timing for a signal to be transmitted from the terminal unit 200 to the radio base station 100.

Specifically, advanced timing is calculated such that it is timed with the timing of a corresponding receiving slot of the radio base station 100.

[S35] Using the SCCH, the terminal unit 200 transmits a link channel establishment request to the radio base station 100 in accordance with the thus-calculated transmission timing.

[S36] If the link channel establishment request is normally received, the radio base station 100 sends a link channel allocation back to the terminal unit 200, by using the SCCH.

[S37] Location registration, call origination and call termination are thereafter performed between the radio base station 100 and the terminal unit 200. However, when the terminal unit 200 transmits up data to the radio base station 100, all such data is transmitted by the signal transmitting means 44 in accordance with the transmission timing calculated in step S34.

Figure 10:
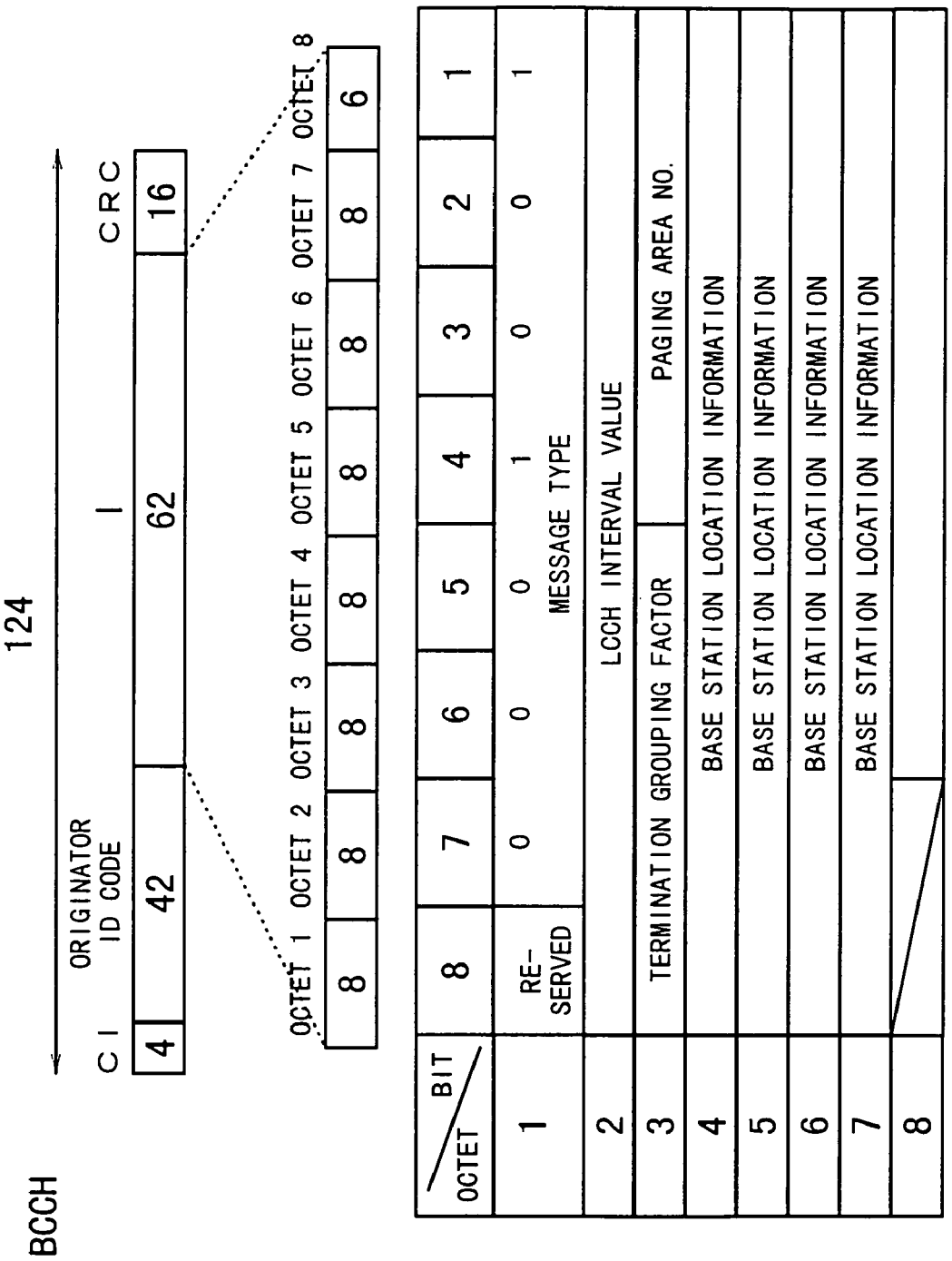
FIG. 10 is a diagram showing a BCCH format structure.

The following describes a format structure of the BCCH which is a control channel used by the base station location information notifying means 32 when notifying the base station location information. FIG. 10 shows the BCCH format structure.

The BCCH has a 124-bit structure. CI, which indicates a channel type, consists of 4 bits; an originator identification code, which is a local call sign, consists of 42 bits; I, which is an information section, consists of 62 bits; and CRC consists of 16 bits.

The information section I comprises 8-bit octets 1 to 7 and a 6-bit octet 8. In the octet 1, "RESERVED" is a bit indicative of private or public use, and "MESSAGE TYPE" begins from the seventh bit and indicates that the message is a BCCH message when it has the value (0001001).

In the octet 2, "LCCH INTERVAL VALUE" indicates an intermittent period of slots for down LCCH (logic control channel). The LCCH includes BCCH, PCH, SCCH and USCCH, and is a general term for function channel used in link channel establishment phase.

In the octet 3, "TERMINATION GROUPING FACTOR" indicates a value corresponding to a grouping number of PCH (paging channel) information, and "PAGING AREA NO." indicates, for public use, a bit length of a paging area number of CS-ID (radio base station ID).

In the octets 4 to 7, the base station location information used in the present invention is described. In the figure, four octets are reserved as an area for describing the base station location information therein.

Figure 11:
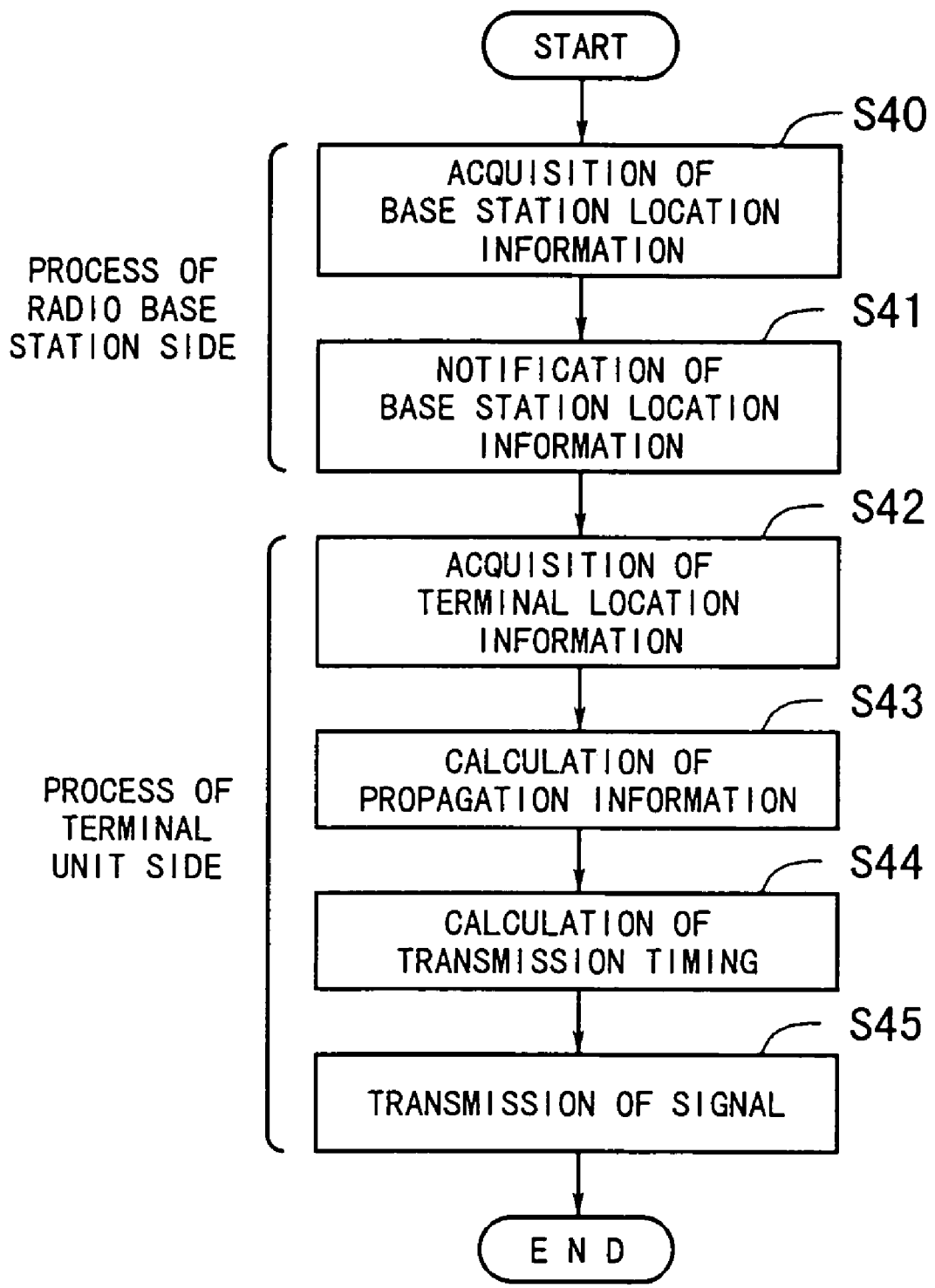
FIG. 11 is a flowchart showing a procedure of a radio communication method according to the present invention.

A radio communication method according to the present invention will be now described. FIG. 11 is a flowchart showing a procedure of the radio communication method according to the present invention.

[S40] Base station location information, which is information about the location of the radio base station, is acquired.

[S41] The base station location information is notified.

[S42] Terminal location information, which is information about the location of the terminal unit, is acquired.

[S43] Based on the base station location information and the terminal location information, propagation information about radio wave propagation between the radio base station and the terminal unit is calculated.

[S44] Based on the propagation information, transmission timing for a signal to be transmitted from the terminal unit to the radio base station is calculated.

[S45] Signal is transmitted in accordance with the transmission timing.

As described above, in the radio communication system 2 and method according to the present invention, propagation information about the radio wave propagation between the radio base station 100 and the terminal unit 200 is calculated based on the information about the locations of the radio base station 100 and the terminal unit 200, and transmission timing t is calculated based on the propagation information for transmitting signal.

This makes it possible to expand the coverage of the radio base station 100, thus permitting efficient radio communications.

Figure 12:
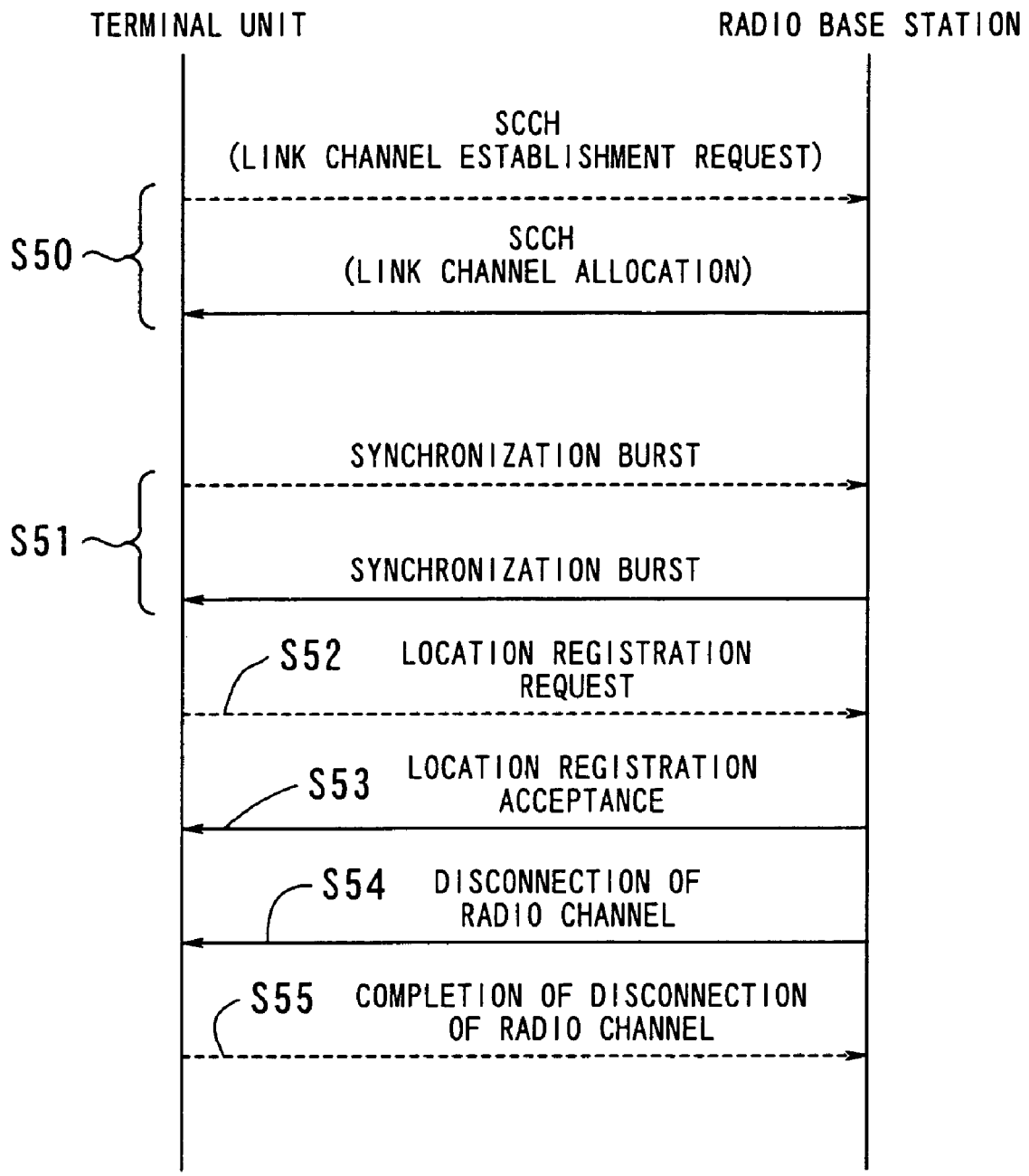
FIG. 12 is a chart showing a location registration sequence.

The following describes sequences of location registration, call origination and call termination which are carried out after the transmission timing is determined as described above in the radio communication system 1 or 2 or by the radio communication method. FIG. 12 illustrates the location registration sequence.

To permit connection of an incoming call from the radio base station to the terminal unit, the terminal unit performs location registration in advance to register its own location in the radio base station.

[S50] A link channel establishment request and a link channel allocation are performed via the SCCH using control time slots.

[S51] The radio base station and the terminal unit establish synchronicity by means of a synchronization burst signal.

[S52] The terminal unit makes a location registration request to the radio base station.

[S53] The radio base station sends a location registration acceptance back to the terminal unit.

[S54] The radio base station instructs the terminal unit to disconnect the radio channel.

[S55] The terminal unit notifies completion of disconnection of the radio channel.

In Step S51 and the subsequent steps, the bearer time slots are used. All of the transmissions (indicated by dashed arrows) from the terminal unit to the radio base station are performed in accordance with the advanced transmission timing.

Figure 13:
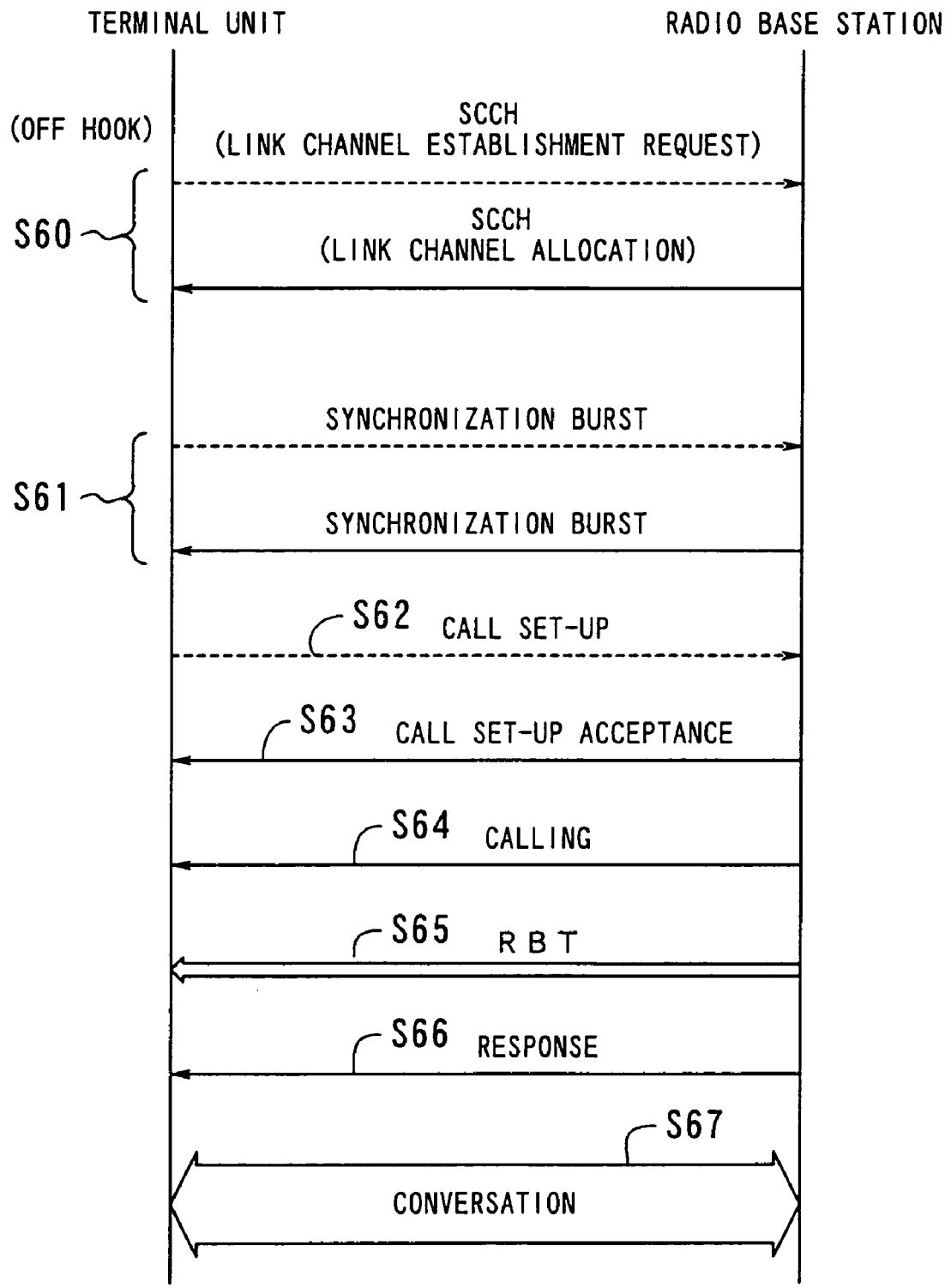
FIG. 13 is a chart showing a call origination sequence.

FIG. 13 shows the call origination sequence. Call origination is a call connection phase for establishing a service channel (SCH) used for transmission of voice, data, etc., at the request of the terminal unit.

[S60] A link channel establishment request and a link channel allocation are performed via the SCCH using control time slots.

[S61] The radio base station and the terminal unit establish synchronicity by means of a synchronization burst signal.

[S62] The terminal unit makes a call set-up with respect to the radio base station.

[S63] The radio base station sends a call set-up acceptance back to the terminal unit.

[S64] The radio base station makes a calling to the terminal unit.

[S65] The radio base station transmits RBT (ring back tone) to the terminal unit.

[S66] The radio base station makes a response to the terminal unit.

[S67] The terminal unit is permitted conversation via the radio base station.

In Step S61 and the subsequent steps, the bearer time slots are used. All of the transmissions (indicated by dashed arrows) from the terminal unit to the radio base station are performed in accordance with the advanced transmission timing.

Figure 14:
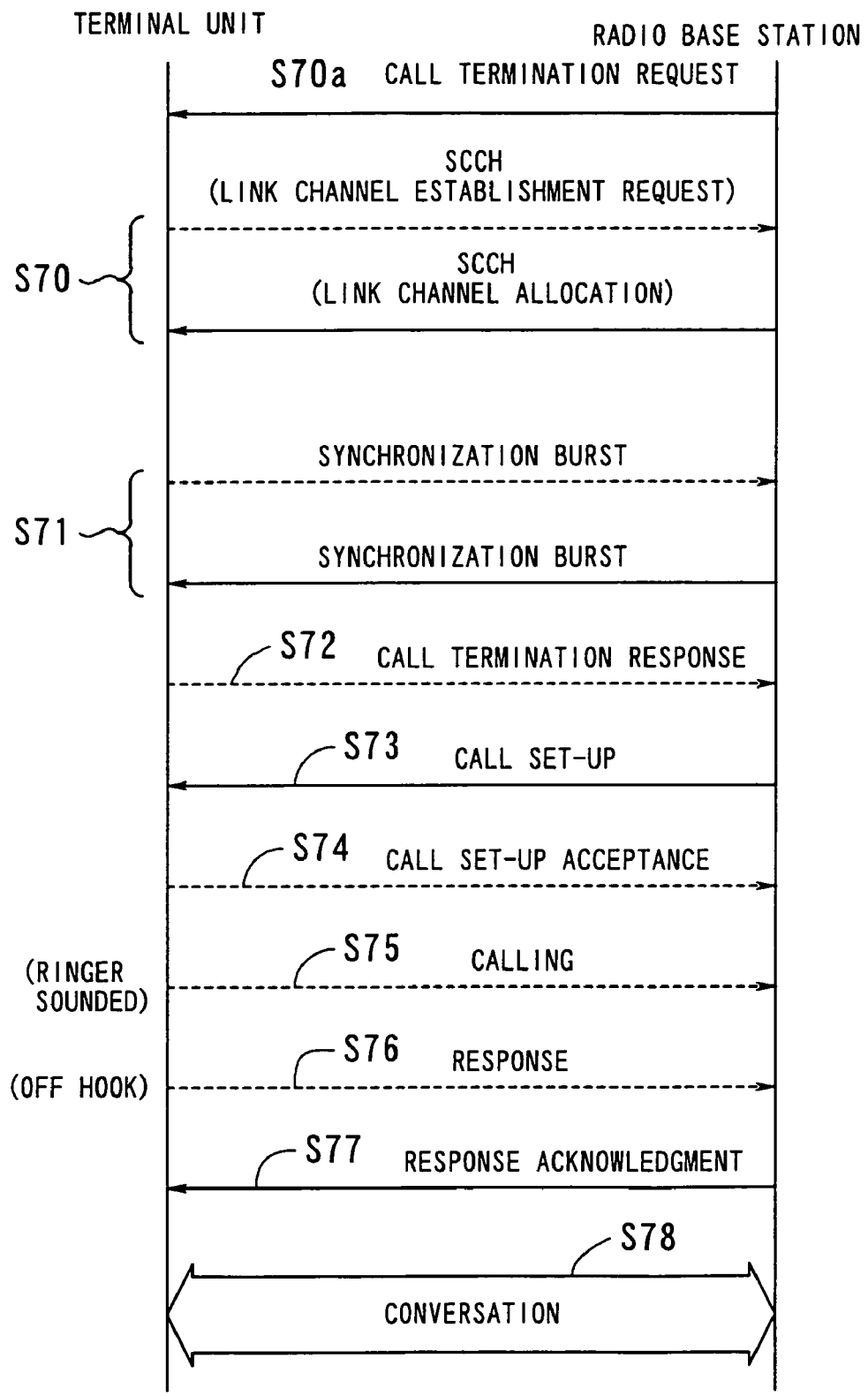
FIG. 14 is a chart showing a call termination sequence.
Figure 15:
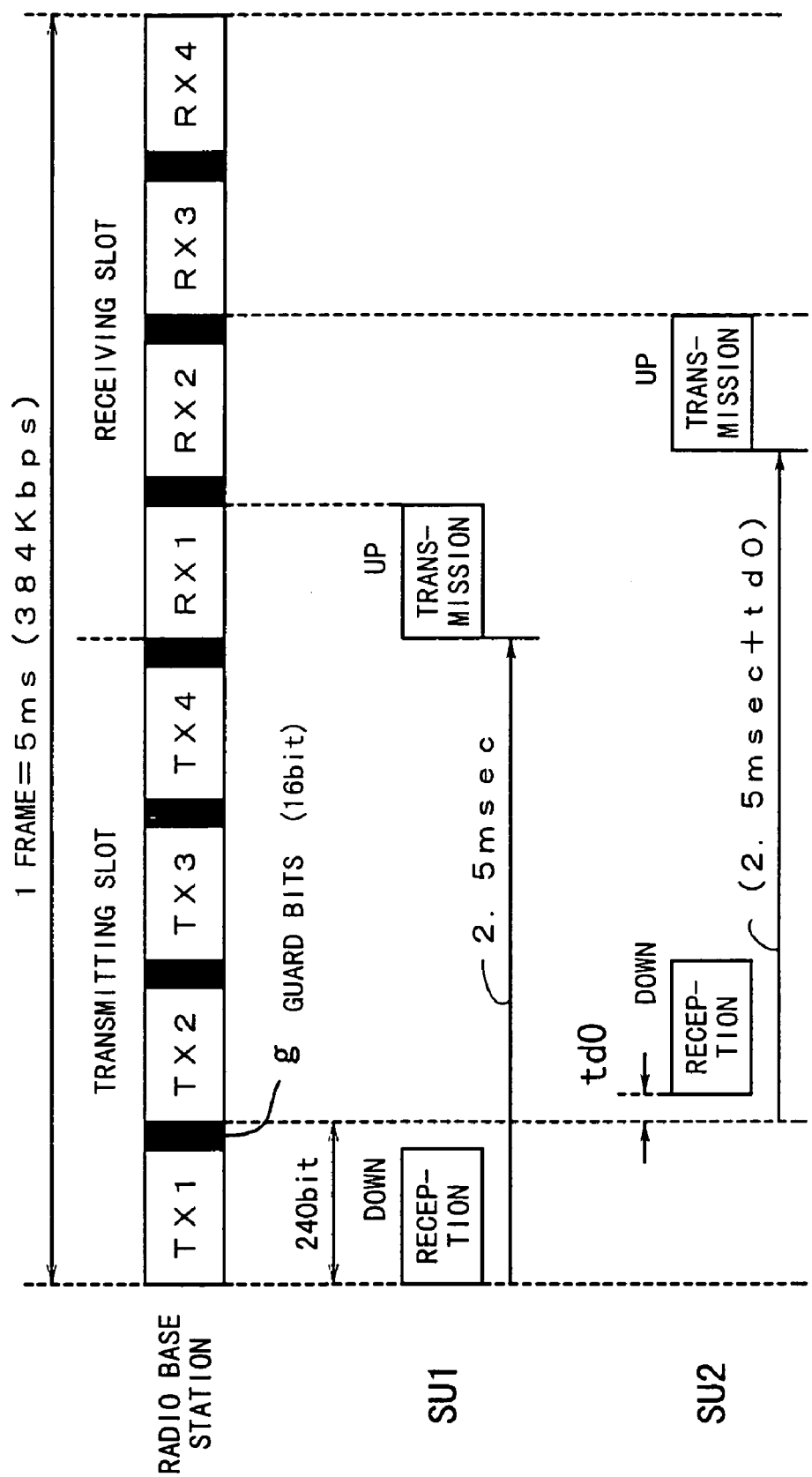
FIG. 15 is a diagram showing an arrangement of slots in a TDMA-TDD frame.
Figure 16:
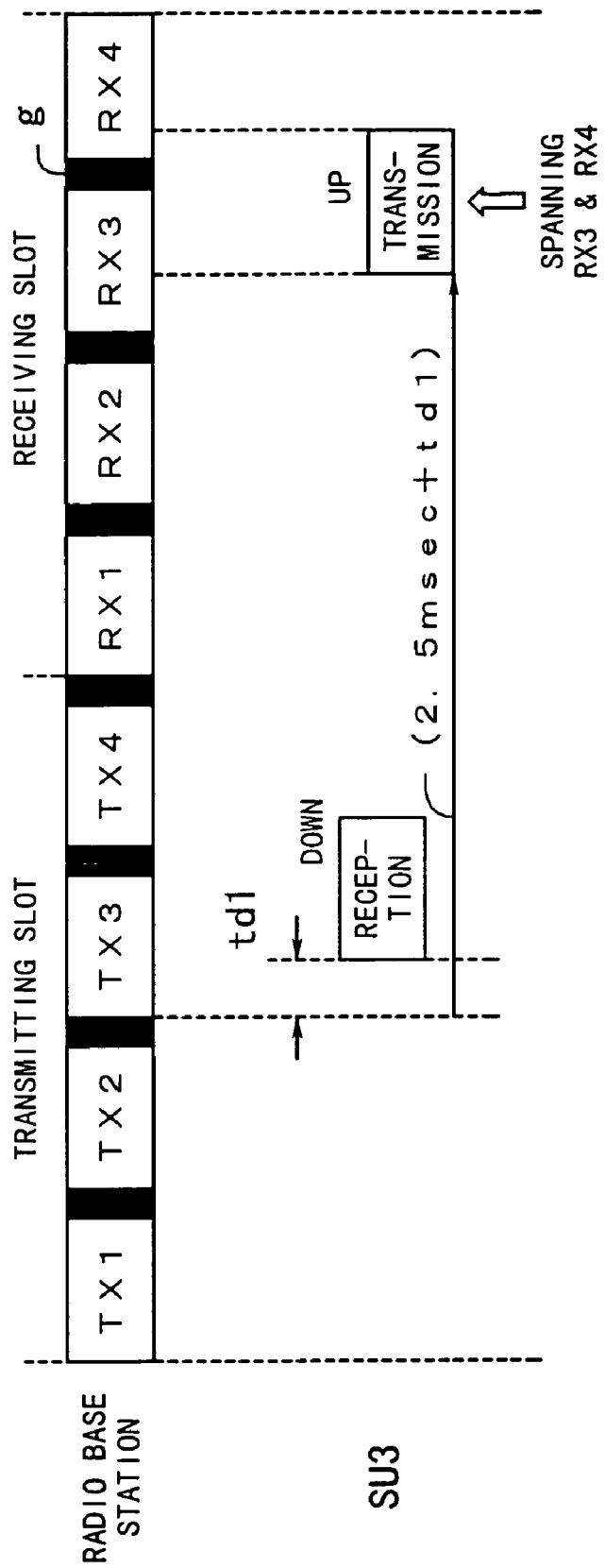
FIG. 16 is a diagram illustrating a problem with conventional TDMA-TDD.

FIG. 14 shows the call termination sequence. Call termination is a call connection phase for establishing the SCH used for transmission of voice, data, etc., at the request of the network side.

[S70a] The radio base station transmits a call termination message (PCH) to the terminal unit to notify same of an incoming call.

[S70] A link channel establishment request and a link channel allocation are performed via the SCCH using control time slots.

[S71] The radio base station and the terminal unit establish synchronicity by means of a synchronization burst signal.

[S72] The terminal unit makes a call termination response to the radio base station.

[S73] The radio base station makes a call set-up with respect to the terminal unit.

[S74] The terminal unit sends a call set-up acceptance back to the radio base station.

[S75] The terminal unit makes a calling to the radio base station.

[S76] The terminal unit makes a response to the radio base station.

[S77] The radio base station sends a response acknowledgment back to the terminal unit.

[S78] The terminal unit is permitted conversation via the radio base station.

In Step S71 and the subsequent steps, the bearer time slots are used. All of the transmissions (indicated by dashed arrows) from the terminal unit to the radio base station are performed in accordance with the advanced transmission timing.

As described above, in the radio communication system according to the present invention, continuous time slots are allocated, and during the period of the continuous time slot, communication with a terminal unit is performed to calculate propagation information about radio wave propagation between the radio base station and the terminal unit and transmission timing is calculated based on the propagation information for transmitting signal. This makes it possible to expand the coverage of the radio base station, permitting efficient radio communications.

Also, in the radio communication method according to the present invention, continuous time slots are allocated, and during the period of the continuous time slot, communication with a terminal unit is performed to calculate propagation information about radio wave propagation between the radio base station and the terminal unit and transmission timing is calculated based on the propagation information for transmitting a signal. This similarly makes it possible to expand the coverage of the radio base station, thus permitting efficient radio communications.

Further, in the radio communication system according to the present invention, propagation information about radio wave propagation between the radio base station and the terminal unit is calculated based on the information about the locations of the radio base station and the terminal unit, and based on the propagation information, transmission timing is calculated for transmitting a signal. Consequently, the coverage of the radio base station is expanded and efficient radio communications can be performed.

According to the radio communication method of the present invention, moreover, propagation information about radio wave propagation between the radio base station and the terminal unit is calculated based on the information about the locations of the radio base station and the terminal unit, and based on the propagation information, transmission timing is calculated for transmitting a signal. Accordingly, the coverage of the radio base station is expanded, so that efficient radio communications can be performed.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A radio communication system for performing radio communication control having frames with a plurality of transmit and receive time slots and guard intervals between said receive time slots, said system as implemented in a base station comprising:

a propagation information calculation device comprising:
        a continuous time slot allocating means for allocating an up continuous time slot comprising a single continuous transmitting time slot and a single continuous expanded guard bit portion and for allocating, to a terminal device, a down continuous time slot comprising a single continuous receiving time slot and a single continuous expanded guard bit portion, and
        a propagation information calculating means for communicating with the terminal unit during a period defined by the single continuous transmitting time slot to calculate propagation information about radio wave propagation between a radio base station and the terminal unit;
    wherein a transmission timing calculation device, located in a terminal unit, comprises: a transmission timing calculating means to calculate, during the period of the single continuous transmitting time slot and based on the propagation information, transmission timing for a signal to be transmitted from the terminal unit to the radio base station; and a signal transmitting means to transmit the signal in accordance with the transmission timing,
    whereby an expanded range of protection is provided by the expanded guard bits by delaying transmission based on said calculated transmission timing so that up data is received in a receiving time slot.

2. A radio communication system for performing radio communication control having frames with a plurality of transmit and receive time slots and guard intervals between said receive time slots, comprising:

a propagation information calculation device including continuous receive time slot allocating means for allocating to a terminal unit than one receive time slot in a frame to generate from the more than one receive time slot a continuous receive time slot, which includes a single continuous receive portion and a single continuous expanded guard bit portion for the terminal unit, and propagation information calculating means for communicating with the terminal unit during a period of the continuous time slot to calculate propagation information about radio wave propagation between a radio base station and the terminal unit; and a transmission timing calculation device including transmission timing calculating means for calculating, during the period of the continuous time slot and based on the propagation information, transmission timing for a signal to be transmitted from the terminal unit to the radio base station, and signal transmitting means for transmitting the signal in accordance with the transmission timing, wherein to calculate the propagation information, said propagation information calculating means measures a time from transmission of test data to the terminal unit to reception of the test returned from the terminal unit, and calculates at least one of a radio wave propagation time and distance between the radio base station and the terminal unit, and said continuous receive time slot allocating means cancels allocation of the continuous receive time slot after the transmission timing is calculated.

3. The radio communication system according to claim 2, wherein said transmission timing calculation device stores information on the calculated transmission timing in a nonvolatile memory.

4. A method as implemented in a radio base station for calculating radio wave propagation information utilizing frames with a plurality of transmit and receive time slots and guard intervals between said receive time slots, said method comprising:

allocating an up continuous time slot comprising a single continuous transmitting time slot and a single continuous expanded guard bit portion and for allocating, to a terminal device, a down continuous time slot comprising a single continuous receiving time slot and a single continuous expanded guard bit portion, and calculating means for communicating with the terminal unit during a period defined by the single continuous transmitting time slot to calculate propagation information about radio wave propagation between a radio base station and the terminal unit; and receiving a calculated transmission timing for a signal to be transmitted from the terminal unit to the radio base station, said calculation performed during the period of the single continuous transmitting time slot and based on the propagation information, and receiving a transmitted signal in accordance with the transmission timing, wherein an expanded range of protection is provided by the expanded guard bits by delaying transmission based on said calculated transmission timing so that up data is received in a receiving time slot.

5. A radio communication method for performing radio communication control having frames with a plurality of transmit and receive time slots and guard intervals between said receive time slots, comprising:

allocating to a terminal unit more than one receive time slot in a frame to generate a continuous receive time slot for the terminal unit, said continuous receive time slot includes a single continuous receive portion and a single continuous expanded guard bit portion;

communicating with the terminal unit during a period of the continuous time slot to calculate propagation information about radio wave propagation between a radio base station and the terminal unit;

calculating, during the period of the continuous time slot and based on the propagation information, transmission timing for a signal to be transmitted from the terminal unit to the radio base station; and transmitting the signal in accordance with the transmission timing, wherein to calculate the propagation information, a time from transmission of test data to the terminal unit to reception of the test data returned from the terminal unit is measured to calculate at least one of a radio wave propagation time and distance between the radio base station and the terminal unit.

6. A transmission timing calculation device arranged in a terminal unit for calculating transmission timing for a signal and utilizing frames with a plurality of transmit and receive time slots and guard intervals between said receive time slots, comprising:

transmission timing calculating means for calculating, during a period of a continuous time slot generated by allocating to the terminal unit more than one transmit time slot and more than one receive time slot in a frame the more than one receive time slot generating a continuous expanded guard bit portion, transmission timing for a signal to be transmitted from the terminal unit to a radio base station in accordance with propagation information about radio wave propagation between the radio base station and the terminal unit; and signal transmitting means for transmitting the signal in accordance with the transmission timing.

7. A propagation information calculation device arranged in a radio base station for calculating radio wave propagation information utilizing frames with a plurality of transmit and receive time slots and guard intervals between said receive time slots, comprising:

continuous receive time slot allocating means for allocating to a terminal unit more than one receive time slot in a frame to generate from the more than one receive time slot a continuous receive time slot, which includes a single continuous receive portion and a single continuous expanded guard bit portion for the terminal unit; and propagation information calculating means for communicating with the terminal unit during a period of the continuous time slot to calculate the radio wave propagation information about radio wave propagation between the radio base station and the terminal unit.

* * * * *